(12) United States Patent
Linzell

(10) Patent No.: US 6,784,244 B1
(45) Date of Patent: Aug. 31, 2004

(54) ANTI-LUBRICANT COMPOSITIONS

(75) Inventor: Geoffrey Robert Linzell, Hatfield (GB)

(73) Assignee: Ball Burnishing Machine Tools Limited, Hertfordshire (GB)

( * ) Notice: Subject to any disclaimer, the term of this patent is extended or adjusted under 35 U.S.C. 154(b) by 0 days.

(21) Appl. No.: 09/444,970

(22) Filed: Nov. 22, 1999

Related U.S. Application Data

(63) Continuation of application No. 08/750,690, filed as application No. PCT/GB95/01361 on Jun. 12, 1995, now Pat. No. 5,988,483.

(30) Foreign Application Priority Data

Jun. 17, 1994 (GB) ............................................ 94/12226

(51) Int. Cl.$^7$ ............................................ C08K 5/5419
(52) U.S. Cl. .................................................. 524/731
(58) Field of Search .......................................... 524/731

(56) References Cited

U.S. PATENT DOCUMENTS 4,675,372 A 6/1987 Policastro .................... 528/26
4,980,167 A * 12/1990 Harashima et al. ......... 424/401
5,348,210 A * 9/1994 Linzell ........................ 228/115
5,431,832 A * 7/1995 Crowe et al. .............. 252/49.5

\* cited by examiner

*Primary Examiner*—Margaret G. Moore
(74) *Attorney, Agent, or Firm*—Synnestvedt & Lechner LLP

(57) ABSTRACT

The present invention is drawn to an anti-lubricant in the form of a composition that is a viscous fluid, a paste, a gel or even a semi-solid rubber-like material. More specifically, the invention suggests the use as the anti-lubricant of a composition of two or more siloxanes chemically reacted together to form a desirably thick viscous fluid, paste, gel or rubbery solid reaction product, the resultant reaction product being admixed with a more liquid, mobile siloxane that itself has anti-lubricant properties, this more mobile siloxane, which may be either one of the two reacted together or a completely different one, is immobilized—stably dispersed—within the reaction product (and not only provides the required anti-lubricant property but may also be used to modify the final "viscosity" of the composition).

20 Claims, No Drawings

ANTI-LUBRICANT COMPOSITIONS

CROSS-REFERENCE TO RELATED APPLICATIONS

This application is a continuation of U.S. application Ser. No. 08/750,690, filed Dec. 17, 1996 (now U.S. Pat. No. 5,988,483), which is the U.S. national stage of application PCT/GB95/01361, filed Jun. 12, 1995, which claims priority of British Application No. 94/12226.4, filed Jun. 17, 1994.

This invention is concerned with anti-lubricant compositions, and relates in particular to such compositions which may be of use in the joint-producing methods described in our International Patent Application PCT/GB 91/00,950 (now published as WO 91/19,589) and a number of subsequent Applications.

In the Specification of the aforementioned PCT Application [P1220: Trib-joints] there is described and claimed a method of securing against lateral motion two bodies held in face to face asperity contact, thereby to make a join between the two bodies, in which method there is inserted into the interface between the two bodies a material that on minimal initial lateral relative motion of the two surfaces promotes rapid but controllable "galling" between the two surfaces, this galling binding the surfaces against further such motion. The material inserted into the interface, and which causes the galling, is variously referred to as a galling agent, gall promoter, gall enhancer, or anti-lubricant, and the present invention relates to particularly preferred such anti-lubricants, and to compositions thereof. Variants of this are described in the Specification of our International Patent Application PCT/GB 93/00,046 (now published as WO 93/13,908) [P1284: Trib-bond].

The method of the two aforementioned Specifications is very suitable for joining bodies that fit well together, but not always so good at joining bodies that don't, and in the Specification of our International Patent Application PCT/GB 94/00,869 (now published as WO 94/25,216) [P1286: Trib-paste] there is described and claimed another variant of the method, this variant being especially adapted for use with "ill"-fitting joints—that is, joints where it is thought that the two faces to be joined might not be in good face-to-face asperity contact, so there is a gap therebetween—in which there is employed to fill the gap a composition comprising a multiplicity of small metal particles surrounded by or coated with a gall-promoting fluid that acts as a viscous binder.

In the aforementioned WO 91/19,589 and WO 93/13,908 Specifications the preferred described anti-lubricants are said generally to be liquid, especially such a material that appears in use to act as an oxygen scavenger when placed in contact with the material of the two bodies to be joined together. Typical examples of these materials are said to be the range of poly-dimethylsiloxane and polymethylhydrogensiloxane liquids of viscosities generally up to 100 c/s (volatile versions of similar siloxanes can be used where the surplus liquid that exudes from the joint naturally evaporates after the joint is formed). The same materials are identified in our aforementioned WO 94/25,216 Specification, while others are there described as being similar siloxanes but with amino active side groups that are able to cross link, or "vulcanise", after the joint is made so as to form a synthetic rubber cocoon, and so prevent any small loose unbonded metal particles breaking loose in service.

Both the liquid anti-lubricant materials and the metal-particle-containing compositions of our aforementioned International Applications have proved satisfactory, but nevertheless there are occasions where the joint to be made is constructed from well-fitting parts, so that there is no need for the metal-filled viscous compositions of the latter, and yet the typically more liquid materials of the former are somewhat too fluid—or, rather, surface active—and tend to creep or even to flow out from their application site (which is not only wasteful of material, but means there is a risk of the anti-lubricant turning up where it is not wanted, which might even result in some damage being caused). It would seem that this dilemma might be solved by the provision of the anti-lubricant in the form of a composition that is a viscous fluid, a paste, a gel or even a semi-solid rubber-like material, and it is broadly this that the present invention proposes. More specifically, the invention suggests the use as the anti-lubricant of a composition of two or more siloxanes chemically reacted together to form a desirably thick viscous fluid, paste, gel or rubbery solid reaction product, the resultant reaction product being admixed with a more liquid, mobile siloxane that itself has anti-lubricant properties, this more mobile siloxane, which may be either one of the two reacted together or a completely different one, is immobilised—stably dispersed—within the reaction product (and not only provides the required anti-lubricant property but may also be used to modify the final "viscosity" of the composition).

In one aspect, therefore, the invention provides a silicone composition having anti-lubricant properties and thus being of use in the promotion of galling between two gallable surfaces, the composition comprising a stable dispersion of a relatively mobile gall-promoting silicone "immobilised" within a matrix made of the cross-linked reaction product of at least two polyfunctional siloxanes and having the form of a viscous fluid, a paste, a gel or a rubbery solid.

The invention involves the utilisation of a silicone composition having anti-lubricant properties and thus being of use in the promoting of galling between two gallable surfaces. The concept of galling agents, anti-lubricants, and the promotion or enhancement of galling is well-known from our aforementioned Specifications, and needs no further comment at this time, save perhaps to summarise things by saying that certain types of metal joint, typically that having a form similar to a violin string tuning peg stuck in its hole in the scrolled end of the neck, can be made to bind together by material from one surface being transferred to the other, to make a lump rather like a gall (as seen on plants), this gall causing the joint surfaces to jam one onto the other, and to observe that gall formation can be promoted or enhanced by certain chemicals that seem to have the opposite effect to ordinary lubricants.

The composition of the invention contains the cross-linked reaction product of at least two different monomeric units each of which is itself a polyfunctional siloxane polymer (the product is thus a co-polymer). These materials are polyfunctional in that each contains at least two, and preferably at least three, functional groups (which may be the same or different) by which it can react with, and so attach itself to, the other to form a loose three-dimensional matrix capable of holding the relatively mobile gall-promoting silicone therewithin. Moreover, they are siloxanes—that is, they are themselves silicone polymers made up of many units derived from moieties of the type

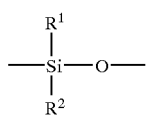

wherein R¹ is an alkyl group, and R² is the same or a different alkyl group (the preferred alkyl group R¹ and R² is the methyl group); these siloxane starting materials are themselves conveniently prepared by reacting corresponding compounds wherein some of the R groups are hydrogen with the donors of the required functional groups. The more useful starting siloxanes seem to be those of relatively limited reactivity, and those of relatively low molecular weight, and thus relatively short chain length (the number of the above moieties in each unit is conveniently, but not necessarily, from below 10 to above 300.

As to the functional groups, these can, within reason, be almost any set of groups capable of reacting one with another to form the desired polymeric product. One suitable pair of such groups is amine and dicarboxylic anhydride,

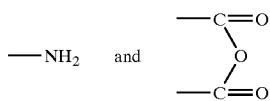

which react together, two amine to one anhydride, to form amide linkages

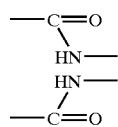

many of which will result in several molecules being cross-linked eventually to form a matrix having a complex dimensional structure.

Depending upon the polyfunctionality of the monomers chosen, the reaction product may be a linear polymer and yet, by virtue of the shape and 3D nature of the monomers, have a 2D or even 3D shape of its own, or it may be a 2D macromolecule, rather like a net, or a 3D macromolecule like a sponge. Moreover, even where the product is mostly sheet- or net-like, it may be interlinked so as to result in a loose three-dimensional structure. The problem is that determining the physical shape and structure of giant molecules such as these is extremely difficult, and at this time it is not easy to provide any information thereon except educated guesswork.

As will be apparent, the two (or more) polyfunctional siloxanes may have a wide variety of forms, but are preferably polydimethyl siloxanes with amino or anhydride functional groups. Most preferably they are of relatively low molecular weight (and thus have a relatively short chain length). Typical actual materials are the following:

Masil 28. This is a "hydrosilicone" manufactured by Pittsburgh Plate Glass (PPG) Chemicals. It is believed to be a polydimethylsiloxane (with around 100–110 dimethylsiloxane monomer units) typically containing four active acid anhydride groups. It has a molecular weight of about 8,000, and a viscosity of around 130 c/s, and is said to be disclosed in PPG U.S. Pat. No: 4,876,152.

DC 536 This is made by Dow Corning. It is understood to be an amino, methoxy double-functional polydimethylsiloxane (with around 120–140 monomer units, molecular weight 9,000 and viscosity 160 c/s).

DC 109 Made by Dow Corning, this is thought to be a hydroxy-terminated polydimethyl siloxane (estimated chain length 600–650, molecular weight 47,000 and viscosity 4000 c/s).

DC 1107 Made by Dow Corning, this is a polymethyl-hydrogen siloxane (estimated chain length 30–35, molecular weight 2,600, viscosity 30 c/s).

Rhodorsil 1300 This is an amino functional material made by Rhone-Poulenc's Spanish subsidiary Siliconas Hispania. It is understood to be a monoamine polydimethylsiloxane (chain length estimated to be 16–20, molecular weight 1,500, viscosity 14 c/s; amine content equivalent to 14,840 ppm N).

Rhodorsil Oil 21637 Another amino functional material from Rhone-Poulenc, believed to be a diamine polydimethylsiloxane (chain length estimated at 160–180, molecular weight 13,500, viscosity 300 c/s; amine content 4,200 ppm).

Rhodorsil Oil 21642 Another amino functional material from Rhone-Poulenc. It is thought to be a diamino polydimethylsiloxane (estimated chain length 340–360, molecular weight 27,000, viscosity 1,000 c/s; amino content 2,100 ppm).

Rhodorsil 48V100 to 1,000,000 A series of materials from Rhone-Poulenc. They are thought to be hydroxy-terminated polydimethylsiloxanes (estimated chain length 85–95, molecular weight 6,700, viscosity 100 c/s).

These, and other suitable materials, are shown in the following Table.

| Material | Viscosity | Mol Wt | Chain Length |
|---|---|---|---|
| Masil 28 | 130 | 8,000 | 100–110 |
| DC536 | 160 | 9,000 | 120–140 |
| DC109 | 4,000 | 47,000 | 600–650 |
| DC1107 | 30 | 2,600 | 30–35 |
| Rhodorsil 1300 | 13.4 | 1,500 | 16–20 |
| Rhodorsil 21637 | 292 | 13,500 | 160–180 |
| Rhodorsil 21642 | 1,000 | 27,000 | 340–360 |
| Rhodorsil 48V100 | 100 | 6,700 | 85–95 |
| Rhodorsil 68 Xlinker | 25 | 2,300 | 28–32 |

The siloxane reaction products used in the compositions of the invention—that is to say, the reaction products themselves, as opposed to the compositions of the invention which use them together with a relatively-mobile gall-promoting silicone—are themselves novel materials, clearly of some usefulness, and the present invention extends to them per se. Thus, in another aspect the invention provides a polymeric silicone comprising the cross-linked reaction product of at least two polyfunctional siloxanes, wherein the polyfunctional siloxane polymers' functional groups are respectively amine and anhydride groups, which react together, two amine to one anhydride, to form amide linkages. Of course, the invention also provides the processes described herein for the preparation of such silicones.

Because the gall-promoting capability of the anti-lubricant component may well involve some oxygen-scavenging effect, it is desirable if free oxygen can be kept away from the contacting surfaces of the joint being made using the compositions of the invention. This can be facilitated if the composition itself—and specifically the reaction product matrix within which the anti-lubricant component is immobilized—acts as a barrier to oxygen, and for that reason it may be advantageous to chooses the reaction product monomers, and thus the reaction product itself, with that capability in mind. As a guide, it has been found that in general the thicker or denser the composition the less room it has for adsorbed oxygen, and the less easily oxygen can subsequently be adsorbed thereinto.

The compositions of the invention may be the reaction product of more than two polyfunctional siloxanes, although at present the properties obtained from a reaction product which is of two (only) siloxanes is quite satisfactory.

The compositions of the invention comprise a stable dispersion of a relatively mobile gall-promoting, anti-lubricant silicone "immobilised", or "stored", within a matrix made of the cross-linked reaction product of two (or more) polyfunctional siloxanes. It is quite possible for the relatively mobile anti-lubricant silicone to be one of the two (or more) siloxanes making up the reaction product matrix; many of these siloxanes are themselves good gall-promoters, and it is a simple matter to arrange that one such component be present in excess (of the stoichiometric amount necessary exactly to match the amount of-the other component(s)), this excess then becoming trapped within the matrix produced. However, it may be inconvenient to make a composition using as one of the two (or more) polyfunctional siloxanes a material that itself has anti-lubricant properties, and accordingly, and in a preferred aspect the invention's anti-lubricant silicone composition are those wherein the relatively mobile gall-promoting silicone immobilised within a matrix made of the cross-linked reaction product is quite different from the siloxanes employed to make that reaction product.

A "different" relatively-mobile anti-lubricant silicone may be almost any of the less viscous silicone/siloxanes previously mentioned as having gall-promoting, anti-lubricant properties (although of course some care should be taken, by simple preliminary tests, to ensure that this component is not incompatible with the reaction product matrix). The preferred siloxane generally suitable for this purpose is Dow Corning (DC) 1107 (a polymethylhydrogensiloxane having a viscosity of 30 c/s: it is mentioned in the Table hereinbefore), as well as DC 200/10 to 100 (these are a series of polydimethyl siloxanes having viscosities in the range 10 to 100 c/s); they are relatively inert and stable, probably because they have unreactive methyl side and end groups.

The amount of the more mobile anti-lubricant silicone that is employed will depend both on the degree of its anti-lubricant effect and on the ability of the reaction product matrix to hold the anti-lubricant (and on the ease with which the latter can be emplaced in the former). It may also depend on the exact physical form of composition required—whether it should be very viscous or only slightly so, whether it should be a stiff paste or a fairly runny one, whether it should be a solid, firm gel, even a "rubbery" material, or a loose, easily-deformable one—for clearly the more anti-lubricant silicone is put into the matrix the more "fluid" the matrix is likely to become.

In general, the anti-lubricant effect of the more mobile silicone is sufficiently strong for only relatively small amounts to be necessary for that purpose—perhaps as little as 5 to 10 vol % based on the reaction product. Moreover, in general the small amount required for giving the composition the desired anti-lubricant properties can always be mixed into, and held by, the reaction product matrix. However, the advantageous viscosity-adjusting effect of the more mobile silicone, which permits the preparation of compositions with a wide range of suitable physical forms, requires considerably more of the mobile silicone, and typical amounts are from 25 to 65 vol %, especially from 40 to 60 vol %, based on the total composition. With such large (proportional) amounts care should always be taken to match the mobile silicone to the matrix so that none, or only an acceptable amount at an acceptable rate, of the mobile silicone leaches out of the composition once it has been applied to the joint surface(s). It is not easy to give any specific directions on this, but it is so simple first to make small test quantities of composition and then to observe whether the mobile constituent separates out that it is not thought too onerous to suggest that the matter be decided on an individual test basis.

The "third" component of the compositions of the invention—the relatively-mobile gall-promoting (or anti-lubricant) silicone—is physically immobilised within the matrix of the cross-linked reaction product. By this is meant in the first instance that the molecules of the anti-lubricant silicone are mechanically held, or trapped, within the structure of the reaction product (it should be noted, though, that many relatively mobile silicones usable as the anti-lubricant component have a limited chemical reactivity of their own, and may in time actually react with the matrix to become chemically bound therein as well as mechanically held thereby). For this holding to be most effectively achievable the siloxane reaction product is preferably the sort of chemically-linked substance that provides a 3D sponge-like "supermolecule" in which the anti-lubricant silicone component is secured so as to prevent it separating out (although in fact quite acceptable compositions have been prepared where the reaction product is thought to have more of a 2D, area-covering sheet-like form).

The anti-lubricant compositions of the invention contain the cross-linked reaction product of two polyfunctional siloxanes together with a gall-promoting silicone. The composition may have those components only, or it may include these constituents together with some other material. Classes of such additional material include thickeners (such as fumed silica), to make the composition more viscous (and perhaps paste- or gel-like, or—in the case of certain OH-terminated siloxane cross-linkers—even rubbery), as well as thinners (typically hydrocarbons like xylene and other, more mobile and fluid siloxanes), to make the composition less viscous.

The invention's composition of cross-linked reaction product and anti-lubricant silicone is required to have the form of a viscous fluid, a paste, a gel or a rubbery solid—rather than, say, that of a mobile fluid or of a dense, rigid solid—in order that in use it will stay where it is put on the surface(s) to be joined. Any of these physical forms are acceptable; that chosen may depend upon the circumstances. Thus, the very viscous fluids are preferred for their ability to stay mostly where they are put and yet to ooze slowly into the intersurface areas of the joints they are to assist in making, and so ensure complete and uniform galling. The gels—that is, compositions which have a jelly-like state—and especially those that exhibit non-Newtonian flow characteristics (particularly those that are thixotropic, being non-flowing when left alone but liquid-like when put under shear stress) are especially preferred because of their enhanced ability not to creep. It will be readily apparent that such gels can very conveniently be smeared over the surface(s) to be joined, and will stay unmoving on each until the two are put together to make the joint, whereupon as the shear forces applied mount the gel will flow into all the parts of the joint to initiate the best and most thorough galling.

Another preferred group is the rubbery solids, which can be useful in two quite separate ways. In one such way, the solid may simply be to increase the ease with which the anti-lubricant contained therein may be applied to the area where the galled joint is to be made (and when in place the two parts of the joint are rammed together to "squeeze" the anti-lubricant out of the rubbery composition and into gall-promoting contact with the surfaces). In another, the solid may be formed as an item, like an O-ring, which is going to serve two different purposes, one to carry the anti-lubricant into place, and the other to effect some action by its very shape and texture (such as to seal the galled joint).

In this general connection it is convenient here to note that though as described hereinafter the compositions of the invention are made (in bulk), and by admixture of the several components, for storage followed by later use and application, the rubbery compositions of the invention have the added bonus that they can actually be formed in situ by reacting the components on the very surface where the composition is later to be employed. For example, if a gear wheel or bearing is to be affixed (by a galled joint) onto a shaft, the shaft itself can be "painted" with first one and then the other composition components, which are then allowed to react to produce a "dry", though possibly slightly "tacky" surface coating that is the required stable composition in its rubbery form, and thereafter—possibly some considerable time thereafter (during which the shaft may be put away in store until it is required)—the mating parts can be slid along the shaft to engage the coated area and be "galled" into place thereat.

It should be noted that these in situ rubbery compositions may stay in a "tacky" state for some considerable time—days, even weeks—and that even while they are like this the more mobile silicone therein should be held fully immobile (so preventing potentially dangerous "creep"); this is a major advantage of the invention's compositions.

It might be thought that, the cross-linked two-polyfunctional siloxane reaction product being itself some sort of silicone polymer, almost any type of siloxane would suffice for this material. This appears not to be the case; conventional high viscosity siloxanes are long-chain molecules which tangle with each-other to provide unusual and slow but persistent flow behaviour (an extreme example of this is seen in the so-called "silicone putty", and these long chain siloxanes themselves are inherently much less effective as anti-lubricants), and when more mobile, more surface-active short- and conventional long-chain siloxanes are blended in to provide the required anti-lubricant properties the resulting compositions suffer badly from "persistent creep" as the individual long-chain molecules untangle and separate with time, and the more mobile constituents leach out. It seems, then, that for the compositions to be successful in preventing creep and leaching of the more mobile component the siloxane used needs to be the sort of chemically-linked substance that provides a 3D sponge-like "supermolecule" in which the several components are bound so as to prevent them separating out. However, an additional possibility, suggested by the behaviour of certain of the compositions of the invention, is that there are formed loose chemical bonds—probably polar bonds—to the surface on which the compositions are placed; compositions in which the reaction product is formed from an amino-functional siloxane reacting with an acid anhydride-functional siloxane contain carbo-silic-acid groupings, and it seems possible that their very high surface tension (and the accompanying disinclination to "creep" across a substrate surface to which they are applied) is related to the manner in which these groupings can form loose bonds with the substrate.

The cross-linked reaction products used in the compositions of the invention may be made very simply by just mixing the several components together in the appropriate quantities, possibly with some suitable temperature control and perhaps—when using certain of the reaction product starting materials that are not too reactive—in the presence of some appropriate catalyst. Moreover, when making a composition containing as the anti-lubricant not an "excess" of one of the monomers making the reaction product but a different, third, more mobile anti-lubricant silicone, this latter may—depending on its actual chemical nature (some otherwise suitable mobile silicones may themselves react with one or other reaction product starting material, which may not be desirable)—either be admixed with the reaction product components before they are themselves mixed, so that the reaction takes place in the presence of the mobile silicone, which is incorporated into the reaction product as it forms, or after they are mixed, so that it is absorbed thereinto rather like water into a sponge. This mixing will normally be a bulk operation, and the formed composition will usually be transferred into suitable containers and then stored until required. Occasionally, though, the composition may desirably be made in situ, as described hereinbefore in connection with the rubbery compositions.

The compositions of the invention can, of course, include other components to improve or modify their effect, their physical state, or their ease of use. For example, were it considered desirable to use a composition to assist in the making of a joint between two ill-fitting parts it would be perfectly possible to incorporate into the composition a myriad of small metal particles in the manner proposed in our aforementioned published International Application WO 94/25,216) [P1286: Trib-paste] (and the resultant composition would then be similar to, though not the same as, one of that Application's own compositions). Again, the compositions might contain some viscosity-modifying material, such as the well-known thickener fumed silica, to give it exactly the right viscosity characteristics. Yet again, the compositions might contain tiny quantities (many dyes are reactive!)—around 2 parts by weight—of some sort of colouring agent—typically a fluorescent dye such as Oil Red 21734 (a phenol-azo-naphthol material) or Oil Orange 15533 (a xanthene derivative)—to render more obvious, and more easily visible, the area of the joint's surface(s) to which they have been applied.

Various Examples and Test Results are now given, though by way of illustration only, to show details of the invention.

1. Preparation of Siloxane Compositions

A number of Examples are given below in the order (for convenience) of the number of constituents used in their formulation, ranging from two up to five. The Examples chosen represent some of each of the principle formulations for implementing the method of the invention. These are chosen as being representative of the huge range of possibilities, and there are many variations feasible within each type, all able to meet the objective below.

All the compositions were made and cured (where applicable) at room temperature in the open atmosphere, using a standard glass beaker with stainless steel spatula for hand-mixing. Generally, each composition took five minutes of vigorous stirring except where rapid cross-linking occurred (and these exceptions are noted).

The compositions were all tested (using one or other of the Tests described hereinafter), and the Test Results are displayed in the Table that follows the Examples, as are also some comparative Test Results for a typical unblended siloxane anti-lubricant (Dow Corning 1107).

The common objective in all the exemplified formulations is to provide a composition of a carrier that is a cross-linked matrix (in the form of a high viscosity fluid, a gel or a rubber) in which a low molecular weight, relatively mobile free anti-lubricant silicone is retained, trapped, and capable of wetting the (metal) surfaces to which the composition is applied. The carrier matrix must be able to hold the anti-lubricant silicone effectively indefinitely both in storage and in use without it leaching or creeping out beyond the area of deliberate application to a surface.

EXAMPLE 1

Preparation of a Two-component Liquid Composition

At room temperature, 25 cc of Masil 28 (a slightly mobile acid anhydride polydimethylsiloxane from PPG: polyfunctional component 1) was vigorously admixed with 75 cc of Rhodorsil 1300 (a highly mobile monoamine polydimethylsiloxane from Rhone Poulenc: polyfunctional component 2), forming a viscous liquid with a strong smell of ammonia.

The obtained composition was physically a clear viscous fluid of about 450 c/s. The material had limited surface activity, and over a 24 hour period a single drop on a clean steel surface spread by 100% beyond its wetted area measured 5 minutes after application.

The shelf life of the composition as a viscous fluid was about 20 days, after which it steadily thickened to a gel-like rubber. It was shown to be a good anti-lubricant in both friction and joining tests; it showed a delta mu ($\delta\mu$) of 0.4 on a standard friction test (see below), and when actually used in the making of galled joints performed satisfactorily.

EXAMPLE 2

Preparation of Another Two-component Liquid Composition

The formulation of Example 1 was repeated, but with the component proportions the other way round. Thus, at room temperature, 75 cc of Masil 28 (polyfunctional component 1) was vigorously admixed with 25 cc of Rhodorsil 1300 (polyfunctional component 2), forming a viscous liquid.

The obtained composition was physically a clear viscous fluid, with a viscosity of about 1000 c/s. This fluid slowly reacted to a very soft gel-like rubber over three days. This rubber was extremely tacky, and was suited to being wiped onto a clean metal surface, to which it would readily adhere.

This composition was shown to have moderate anti-lubricant properties during its rather short shelf life of about 10 days, but it was particularly suited to application to difficult areas. It showed no sign of movement or leaching when applied to a surface.

The composition was successfully tested for its usefulness to make galled joints; the results are shown in the Table below, and demonstrate that this composition was slightly less so than the composition of Example 1.

EXAMPLE 3

Preparation of Another Two-component Liquid Composition

This Example prepares a simple two-part formulation that can be made in situ, either mixed immediately prior to use or applied to a surface as the two separate starting materials that will then rapidly cross-link and form a rubber coating able to act as an anti-lubricant (either immediately or after some period subsequent to the application).

Using the same procedure as before, 50 cc of Masil 28 (polyfunctional component 1) was vigorously admixed with 50 cc of Rhodorsil 1300 (polyfunctional component 2). A high level of cross-linking occurred upon initial agitation (in about 3 secs. and further stirring was impractical). The speed of reaction can be modified by either changing the ratios slightly or adding a third constituent hereinafter.

Alternatively, when applying the individual components to react on a surface the Masil 28 (being the thicker) was applied first and smeared onto a clean surface, and the Rhodorsil 1300 smeared over it. A tacky rubber developed within two seconds of this smearing of one over the other, and further smearing increased the cross linking.

The anti-lubricant properties of this mix are less than that of the compositions of the previous Examples: it is thought that this is because it depends on there being some slight mismatch between the stoichiometric quantities of the constituents. The actual rubber matrix can act as a lubricant, in that it tends to maintain separation between rubbing surfaces. For this composition (and other rubber ones) to be used effectively as an anti-lubricant, there must therefore be applied an external force sufficient to crush the matrix and establish some metal-to-metal rubbing contact, whereupon the formulation appears to have useful anti-lubricant properties.

There was no evidence of creep or leaching, but care must be taken to remove any surplus unmixed materials surrounding the principle area after application and mixing. The surface remained wet for several days.

EXAMPLE 4

Preparation of a Three-component Viscous Fluid Composition 33 cc of Masil 28 was first mixed with 25 cc of DC 1107. 23 cc of Rhodorsil 21642 was then separately mixed with another 25 cc of DC 1107. The two pre-mixes were then mixed together, and a thick, quite heavily cross-linked gel/paste resulted. A further 20 cc of DC 1107 was then added to adjust constituency, and the resulting mix was left to stand for several days.

The resulting cloud viscous fluid composition was allowed to settle, and most of the trapped air escaped. Several lumps of cross-linked material were seen to be floating in the mix, and these were observed to be sites of continuing chemical activity because they developed bubbles (presumably hydrogen from the DC 1107) at their surface. Eventually (over a period of two weeks), the mix stabilized, the aforementioned lumps decomposed, and the fluid slowly cleared.

The composition had a high surface tension, and so showed little sign of spreading after application to a clean metal surface (and there was no evidence of free DC 1107 leaching when left on a surface for 24 hours). The coefficient of friction was high, and this formulation made excellent joints.

If left in the open the material slowly reacted to a rubber over a period of several days, but stored in a sealed glass container the composition proved entirely stable over a period of six months. This long-term stability is attributed at least in part to a small proportion of the DC 1107 reacting selectively with either the excess of amino or acid anhydride functions in the respective starting materials to neutralize the mixture.

The composition of this Example is a viscous fluid anti-lubricant with a long shelf life and with the desired non-creep properties. In this case the composition also has good oxygen masking to enhance the anti-lubricant effectiveness.

EXAMPLE 5

Preparation of a Three-component Gel Composition

Basically, the formulation used here was very similar to that of Example 4, except an inert DC 345 material was substituted for the chemically-active DC 1107, so the polymerisation reaction could proceed to the sort of stage described hereinabove with reference to Example 3.

The produced composition was a cloudy, highly viscous material (approx. 1000 c/s) after initial mixing that slowly cleared and thickened over a period of several days to a gel or very soft rubber-like clear mass. On "rubbing" or "spreading" this material on a steel surface after six months storage in a glass bottle it was found to be soft and tacky, and would wet the steel surface when pressed hard against it.

Subsequent friction and joining tests showed it had retained some useful anti-lubricant properties, as shown in the Table hereinafter.

EXAMPLE 6

Preparation of Three Component Rubber Composition

A rubbery composition was made by mixing (and reacting) together (in the reverse order) the following components:

15 pbw Masil 28 (see above: a slightly mobile polyfunctional component 1)

30 pbw DC 109 (a highly viscous hydroxy-terminated polydimethylsiloxane from Dow Corning: polyfunctional component 2)

50 pbw DC 200/100 (a polydimethylsiloxane from Dow Corning: an anti-lubricant component)

There was also employed 5 pbw stannous octoate as a catalyst).

The components were mixed with a stainless steel spatula in a glass beaker, with stirring after the addition of each.

The immediate result—within 15 minutes—of the mixing and reacting step was a cloudy liquid of about 200 c/s viscosity, but after standing on a glass surface for two hours the product had "cured" to a strong rubber. The obtained composition was physically a medium hard cloudy rubber.

The composition was successfully tested for its usefulness in wetting a surface to make galled joints; the results are shown in the Table below.

EXAMPLE 7

Preparation of a Four-component Viscous Fluid Composition

Basically, the formulation used here was very similar to that of Example 4, except that DC 345 was employed as the relatively-mobile anti-lubricant component instead of most (but not all) of the DC 1107.

12 cc of Rhodorsil 21642 was mixed with 6 cc of DC 1107. To this was added 30 cc of DC 345, and the whole was mixed thoroughly. 17 cc of Masil 28 was then added, and on mixing heavy cross-linking occurred. A further 35 cc of DC 345 was then added and mixed in to reduce the consistency.

A lumpy, cloudy composition with a viscosity above 1000 c/s resulted. The lumps were seen to develop bubbles on their surfaces, evidence of further chemical activity. After a period of six days the fluid cleared, and thickened to the point where it would only just flow (in fact it behaved rather more like a gel than a liquid).

Two days after preparation the composition showed good anti-lubrication characteristics, with a moderately high coefficient of friction and good joint making ability.

EXAMPLE 8

Preparation of a Four-component Viscous Fluid Composition

This Example relates to a viscous fluid anti-lubricant similar to that of Example 4 but using a standard polydimethyl siloxane (DC 200/50) as the main mobile "active" anti-lubricant constituent.

26 cc of Masil 28 was mixed with 23 cc of DC 200/50. To this was added 10 cc of DC 1107 and 18 cc of Rhodorsil 21642, and the whole was mixed thoroughly to produce a heavily cross-linked fluid. A further 23 cc of DC 200/50 was then added to reduce viscosity.

The formed composition was a cloudy but lump-free mix, with a viscosity of about 1000 c/s. The mixture bubbled for some hours after mixing, and then settled to a clear viscous fluid of about 2000 c/s. It showed a moderately high coefficient of friction, and made satisfactory joints.

EXAMPLE 9

Preparation of a Four-component Gel Composition

The composition produced here was a gel; it included a conventional polydimethyl active anti-lubricant of higher molecular weight, and employed an OH-terminated crosslinker in place of the DC 1107 of Example 10.

28 cc of Masil 28 was mixed with 17 cc of DC 109, 15 cc of Rhodorsil 21642 was added together with 50 cc of DC 200/100, and the whole was mixed thoroughly.

Initially, the mix produced a cloudy liquid of about 1000 c/s that bubbled slightly. This then reacted out over two days to a soft gel or rubber-like material with a slightly tackier constitution.

The composition could be wiped onto a surface quite readily after 3 months' storage in a glass bottle, and was able to wet the surface. The thus-wetted surface then showed a reasonable coefficient of friction, and so the composition was acceptable as a joint-making anti-lubricant.

EXAMPLE 10

Preparation of Four Component Rubber Composition

A rubbery composition was made by mixing (and reacting) together in the reverse order the following components:

40 pbw DC 109 (polyfunctional component 1)

5 pbw DC 536 (a fairly mobile methoxy-terminated polydimethylsiloxane from Dow Corning: polyfunctional component 2)

5 pbw DC 1107 (a relatively mobile anti-lubricant component)

50 pbw DC 200/100 (another anti-lubricant component)

The mixture was stirred after adding each component.

The immediate result of the mixing and reacting step was a cloudy liquid of around 2,000 c/s viscosity, but after standing for 18 hours this had "cured" to a tacky soft rubber (which would release free silicone when compressed).

The composition was successfully tested for its usefulness in the making of galled joints; the results are shown in the Table below.

EXAMPLE 11

Preparation of a Three-component Hard Rubber-like Composition 40 cc of DC 109 was mixed with 10 cc of DC 1107. 49 cc of DC 200/50 was then added with 1% zinc octoate as a catalyst, and the mix was stirred thoroughly for five minutes.

Initially, a clear fairly low-viscosity fluid well suited -to moulding resulted. This fluid took about five days at room temperature to react through to a rubber, but at higher temperatures—over 100° C.—this could be accelerated to a few hours.

The resultant rubber was reasonably hard, and showed clear evidence of releasing mobile silicones when compressed on the surface of a steel specimen. This resulted in a modest rise in the coefficient of friction, and could be used to make a reasonable joint. The material showed no sign of releasing silicone when not being compressed.

The composition of the Example was a hard rubber suitable for moulding pre-formed shapes. The rubber carried and retained approximately 50% low molecular weight free silicone anti-lubricant releasable when the rubber was compressed.

EXAMPLE 12

Preparation of a Particulate-metal-loaded Three Component Rubber Composition A metal-particle-loaded rubbery composition, comparable to those pastes the subject of our aforementioned PCT/GB Application WO 94/25,216, was made by mixing (and reacting) together with stirring and in the given order the following components:

- 10 pbw Masil 28 (see above: a slightly mobile polyfunctional component 1)
- 30 pbw DC 109 (see above: a viscous polyfunctional component 2)
- 40 pbw DC 200/100 (see above: an anti-lubricant component)
- 2.7 5 pbw stannous octoate (catalyst)
- 17 pbw Kobelco KPX20 (a steel powder)
- 0.25 pbw Aerosil 200 (a thickening agent)

The immediate result step was a thick grey liquid of about 2000 c/s viscosity that could be "moulded" by gravity, but after standing in an open mould for 12 hours this had "cured" to a strong rubber.

Poured, instead, onto a flat glass strip, the composition cured to give a metal-loaded rubber tape.

The obtained composition was physically reasonably pliable, and was successfully tested for its usefulness in the making of galled joints; the results are shown in the Table below.

EXAMPLE 13

Preparation of a Particulate-metal-loaded Four-component Rubber Composition This Examples relates to a mouldable rubber composition in the form of a soft sponge rubber into which fine spherical metal powder particles are introduced, which composition is useful in the manufacture of preforms.

10 pbw of DC 536 was mixed with 15 pbw of DC 109, then 22 pbw of DC 200/100 was added. Finally, 2 pbw of DC 1107 was added to cause foaming (and if required for a quick cure 1% stannous octoate may be added). To the foaming material was added 50 pbw of metal powder (Kobelco fine powder SUS316 supplied by Kobe Steel Ltd).

The mix initially produced a pourable fluid suited to moulding. Foaming commenced after about 5 minutes, and the reaction then went through to a firm rubber in less than one hour. The rubber remained subtle but dry to the touch with no surface tackiness, so it made a quite suitable formulation for a preform.

A proportion of the DC 200/100 will release from the moulding when compressed to wet adjacent surfaces and thus to cause galling both between the powder particles and between rubbing surfaces.

This material showed an increase in the coefficient of friction, and made a satisfactory joint. It can be used for treating surfaces, where it will bond a thin layer of particles to a surface.

EXAMPLE 14

Preparation of a Stiffer Particulate-metal-loaded Three Component Rubber Composition This Example provides a solid, stiffer metal-loaded mouldable rubber suited to making mouldable preforms and tape.

35 pbw DC 536 were mixed with 25 pbw DC 109, and to the whole was added 20 pbw DC 200/100 to act as the free anti-lubricant. Then, 12 pbw BSA T42 powdered tool steel was added. The presence of the steel severely slows the reaction, and a catalyst—3 pbw stannous octoate—was needed to provide a room-temperature cure.

The composition was initially a free-flowing mouldable mix of about 500 c/s viscosity. The setting reaction became evident after about 1 hour, and took about four hours to complete at room temperature.

This material is useful for spreading onto a steel surface and allowing it to bond to the surface to hold the wetted metal powder in place for latter joint forming as it cures.

The material is also employable for casting into strips or tapes. For this it is beneficial to add stringers of wire (say, up to 5 mm long) orientated along the axis of the tape to strengthen it. The diameter of the wire should be about 80% that of the maximum diameter of the powder, which means in this case the wire should be about 120 micron diameter. Alternatively, fibre reinforcement can be used, but the fibres should be an order of magnitude smaller in diameter than the wires.

The tape can then be employed as a wrapping around a shaft prior to a gear or bearing being forced onto it.

2. Tests and Test Results

Tests for Composition Steadiness

The various compositions described above were all applied to a flat surface and examined for signs of "creep" and separation (leaching) over a period of several weeks. In the creep Test, a single drop of composition was applied to the surface and allowed to spread out naturally (under gravity) for five minutes. The diameter of the covered area was then measured, and used as the reference against which later measurements were compared.

The "leach" Test involved a close examination of the area around the very outside edge of the drop described above, looking for a "fringe" of "witness" marks—the more mobile liquid spreading out from the drop along scratches or other surface imperfections or blemishes on the test surface.

The Results are shown in the Table hereinafter.

Tests for Joint-forming Ability

The several siloxane compositions shown above were all tested for their ability to cause galling, and thus be useful in the formation of galled joints. All the compositions were tested both on real joints, and were all found to be useful, and also on a simple friction test rig, to see what degree of increased friction they caused between two standard mild steel surfaces (this has been found to be a good indicator of whether a composition will be useful in a real joint, and can even be employed to enable a prediction of actual joint strength in a variety of real, practical joints designs)

The Real Joint Test—A Metal Shaft is Binded Into a Bore in a Hub

For each sample an 80 mm long mild steel shaft was accurately turned to 18 mm diameter with a surface roughness of 5 micrometer Ra. A matching bore was turned in a 16 mm deep hub made from a parted-off section of 44×44 mm square section mild steel bar to a diameter of 17.97 mm, giving a nominal interference of 30 micron, and to a roughness of 7 micrometer Ra. The shaft was made slightly undersize for about 20 mm from one end, to allow in the Test itself the hub to be pushed thereon and then pass freely along the shaft to the bigger part, where it was then forced 16 mm further onto the shaft in a power press.

For each shaft/hub combination the chosen composition under test was then coated onto a centre section of the bar, and the hub moved into that section.

The hub/shaft combination was then torque tested (the hub was twisted around the shaft, measuring the forces involved). Up to some initial torque value, typically around 150 Nm, the joint resisted, and then it slipped. It was then forced to slip, and the torque increased (as galling occurred, and the hub binded onto the shaft). As the applied torque was increased above, eventually the shaft yielded—at about 500 Nm.

The Simple Friction Test

Each of the several compositions described above was tested on a rig according to a simple friction test between two metal rods one of which had been provided with a thin layer of the composition and was drawn by the rig across the other against the frictional forces.

The test rig comprised two touching 12 millimeter diameter mild steel rods drawn one across the other, using a Hounsfield tensometer (equipped with a 75 Newton calibrated beam) to determine the force necessary (and thus to give an indication of the friction involved). The load between the rods was 91 Newton (selected to give an average contact area of 0.35 mm$^2$ at a yield pressure of 250 Newton/mm$^2$), and after each test the scuffed contact area—the scarring of one rod's surface by the other's as galling took place—was measured. From the knowledge of the applied load and tensometer-shown tangential force there could be calculated the coefficient of friction (mu, or $\mu$), and from a knowledge of the forces involved when no composition was used there could be found the additional friction—delta mu, or $\delta\mu$—caused by the composition.

The several compositions gave results which are also shown in the Table I below, from which it will be seen that the average increment in the coefficient of friction was around 0.2 to 0.6.

TABLE

| Ex Num | No: of Comp'nts | Physical Form | $\delta\mu$ | Test joint quality (Nm) | max torque | Stability (weeks) | Spread Test (%) (24 hour) | Leach Test |
|---|---|---|---|---|---|---|---|---|
| 1 | 2 | fluid 450 c/s | 0.4 | v. good | >500 | >3 | <100 | slight |
| 2 | 2 | gel | 0.31 | good | >400 | >2 | <0 | none |
| 3 | 2 | rubber | 0.18 | fair | >150 | >25 | 0 | none |
| 4 | 3 | fluid 4000 c/s | 0.58 | excel. | >500 | >25 | <10 | none |
| 5 | 3 | gel | 0.35 | v. good | >500 | >4 | <10 | slight |
| 6 | 4 | soft rubber | 0.19 | fair | >150 | >25 | 0 | none |
| 7 | 4 | fluid 8000 c/s | 0.53 | excel | >500 | >1 | <10 | none |
| 8 | 4 | fluid 2000 c/s | 0.48 | good | >400 | >3 | <10 | none |
| 9 | 4 | gel | 0.38 | good | >400 | >25 | 0 | none |
| 10 | 4 | soft rubber | 0.16 | fair | >150 | >25 | 0 | none |
| 11 | 4 | hard rubber | 0.17 | fair | >150 | >25 | 0 | none |
| 12 | 4 | filled rubber | 0.16 | fair | >150 | >25 | 0 | none |
| 13 | 5 | sponge rubber | 0.19 | fair | >150 | >25 | 0 | none |
| 14 | 5 | firm rubber | 0.21 | good | >400 | >25 | 0 | none |
| Comparison | 1 | fluid 30 c/s | 0.48 | v. good | >500 | >100 | >1000 | N/A |

What is claimed is:

1. An anti-lubricant, silicone composition comprising a stable dispersion of a gall-promoting silicone immobilized within a matrix made of the cross-linked reaction product of at least two polyfunctional siloxanes and having the form of a paste or a gel, wherein the composition is effective in the promotion of galling between two gallable surfaces.

2. A composition as claimed in claim 1, wherein each polyfunctional siloxane forming the cross-linked reaction product contains at least three functional groups by which it can react with, and so attach itself to, the other to form a loose three-dimensional matrix capable of holding the gall-promoting silicone therewithin.

3. The composition of claim 1 in the form of a paste.

4. The composition of claim 1 in the form of a gel.

5. The composition of claim 4 wherein the gel is thixotropic.

6. The composition of claim 4 in the form of a paste.

7. The composition of claim 2 in the form of a gel.

8. The composition of claim 7 wherein the gel is thixotropic.

9. The composition of claim 3 in which the amount of silicone comprises 5 to 10 vol. % based on the reaction product.

10. The composition of claim 4 in which the amount of silicone comprises 5 to 10 vol. % based on the reaction product.

11. The composition of claim 1 in which the amount of silicone is 25 to 65 vol. % based on the total composition.

12. The composition of claim 1 in which the amount of silicone is 40 to 60 vol. % based on the total composition.

13. The composition of claim 3 wherein the siloxanes are crosslinked in the presence of the silicone.

14. The composition of claim 4 wherein the siloxanes are crosslinked in the presence of silicone.

15. The composition of claim 2 wherein the siloxanes are crosslinked in the presence of silicone.

16. The composition of claim 3 wherein one of the siloxanes is said silicone and is present in the composition in a stoichoimetric amount in excess of that required to react with the other siloxane.

17. The composition of claim 4 wherein one of the siloxanes is said silicone and is present in the composition in a stoichoimetric amount in excess of that required to react with other siloxane.

18. The composition of claim 2 wherein one of the siloxanes is said silicone and is present in the composition in a stoichoimetric amount in excess of that required to react with other siloxane.

19. The composition of claim 18 wherein the composition is in the form of a paste.

20. The composition of claim 18 wherein the composition is in the form of a gel.

* * * * *